(12) United States Patent  (10) Patent No.: US 7,659,949 B2
Sawada et al.  (45) Date of Patent: Feb. 9, 2010

(54) BACKLIGHT UNIT AND LIQUID CRYSTAL DISPLAY EMPLOYING THE SAME

(75) Inventors: Shuji Sawada, Azumino (JP); Takashi Taniguchi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 11/718,294

(22) PCT Filed: Oct. 25, 2005

(86) PCT No.: PCT/JP2005/019577

§ 371 (c)(1),
(2), (4) Date: Apr. 30, 2007

(87) PCT Pub. No.: WO2006/049040

PCT Pub. Date: May 11, 2006

(65) Prior Publication Data

US 2008/0088762 A1    Apr. 17, 2008

(30) Foreign Application Priority Data

Nov. 1, 2004   (JP) .............................. 2004-318076

(51) Int. Cl.
*G02F 1/1333* (2006.01)
(52) U.S. Cl. .......................................... 349/58; 349/65
(58) Field of Classification Search ................ 349/58
See application file for complete search history.

(56) References Cited

U.S. PATENT DOCUMENTS 7,095,461 B2 *  8/2006  Kim ............................ 349/58

FOREIGN PATENT DOCUMENTS

| JP | 4-291319 A | 10/1992 |
|---|---|---|
| JP | 7-199180 A | 8/1995 |
| JP | 11-52379 A | 2/1999 |
| JP | 2001-13889 A | 1/2001 |
| JP | 2003-92020 A | 3/2003 |
| JP | 2004-165031 A | 6/2004 |
| JP | 2004-196201 A | 7/2004 |

OTHER PUBLICATIONS

International Search Report of PCT/JP2005/019577, date of mailing Dec. 6, 2005.
Forms PCT/IB/338 and Form PCT/IPEA/409of International Application PCT/JP2005/019577 mailed Aug. 9, 2007.

* cited by examiner

*Primary Examiner*—Richard H Kim
(74) *Attorney, Agent, or Firm*—Westerman, Hattori, Daniels & Adrian, LLP.

(57) ABSTRACT

A backlight unit (2) comprising a shallow box type case (3) having low profile sidewalls and opening upward, a light guide plate (7) in the box type case (3), and a supporting frame (11) containing optical members such as a linear light source (8) and an optical sheet (10) and securing the optical members in place by being fitted in the opening. A first engaging portion (4) is provided on the inside of the sidewall of the box type case (3) and second engaging portions ($12_1$-$12_4$) are provided on the outer surface of the sidewall of the supporting frame (11) being fitted in the upper opening of the box type case (3). A locking means (14) is attached to the second engaging portion such that the locking means (14) engages with and locks the first engaging portion when the first and second engaging portions engage with each other, thus preventing unfastening of the supporting frame. A liquid crystal display employing the backlight unit is also provided.

6 Claims, 4 Drawing Sheets

FIG.2
FIG. 2A
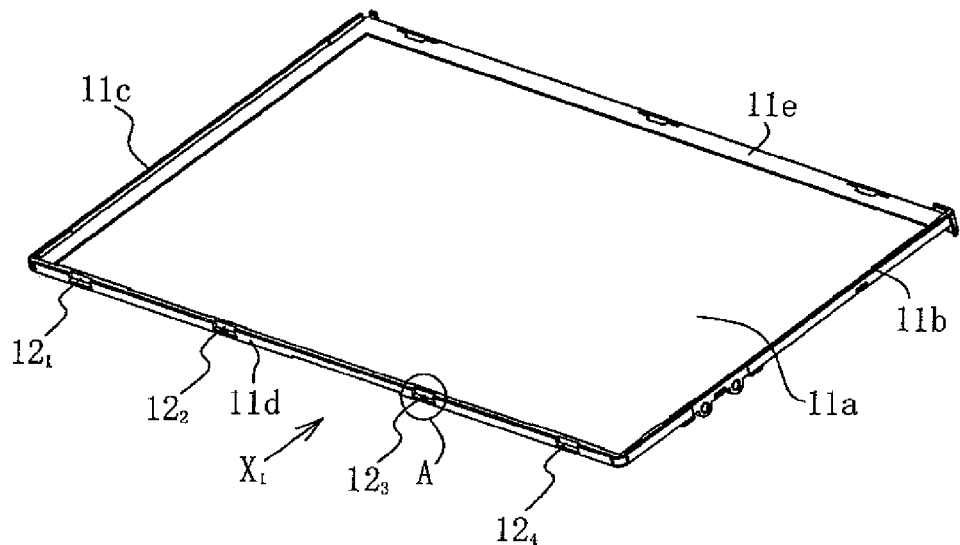
FIG. 2B
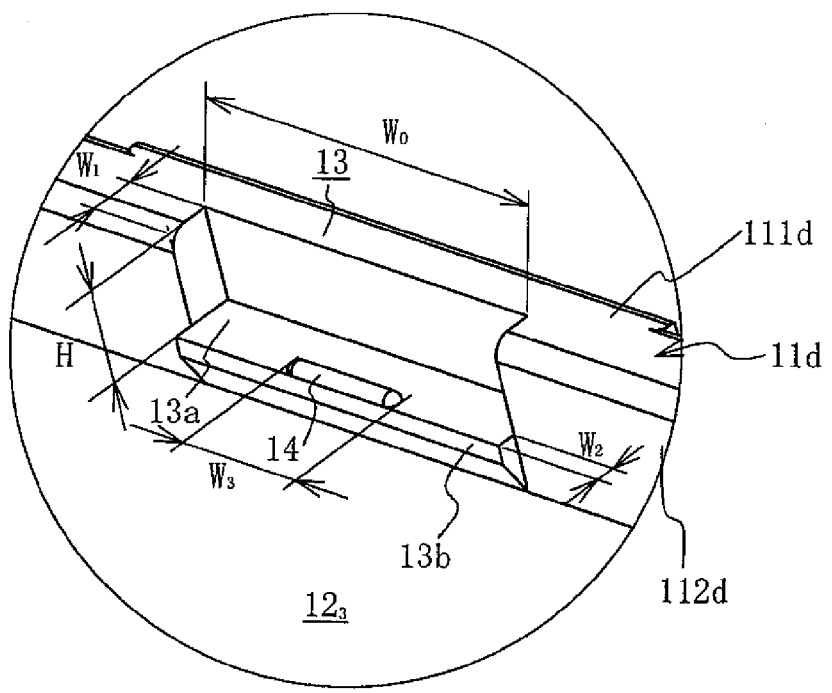

FIG.3
FIG. 3A
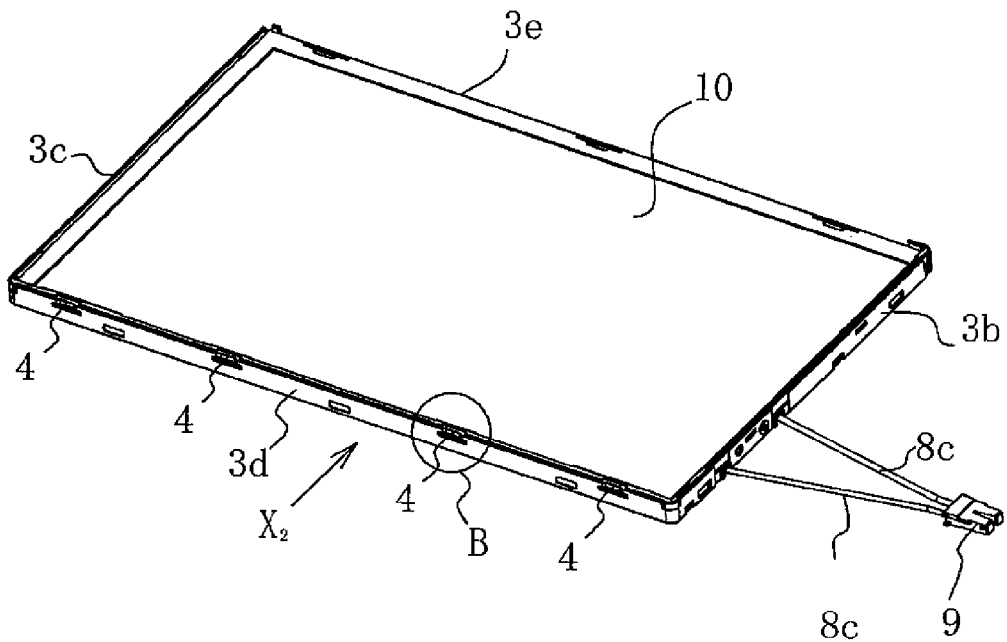
FIG. 3B
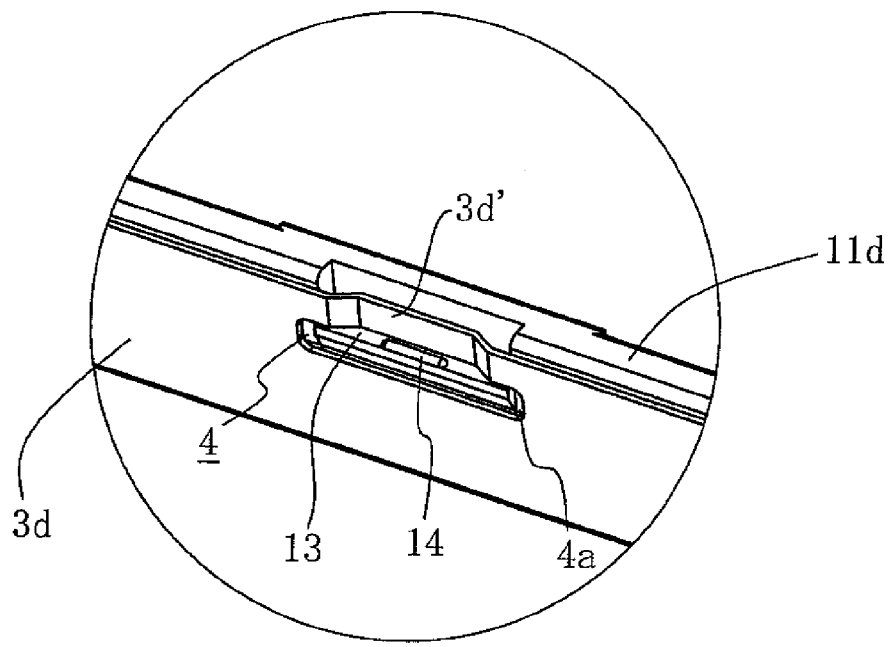

BACKLIGHT UNIT AND LIQUID CRYSTAL DISPLAY EMPLOYING THE SAME

TECHNICAL FIELD

The present invention relates to a backlight unit used for a liquid crystal display. More particularly, the present invention relates to a backlight unit preventing a supporting frame of a backlight assembly from unfastening and a liquid crystal display employing the backlight unit.

RELATED ART

As a backlight employed in a liquid crystal display, a backlight unit adopting a so-called edge light system is known. The edge light system has a linear light source arranged to a side-end surface of a light guide plate to illuminate a liquid crystal display panel with light entered from the side-end surface (for example, refer to Patent Document 1).

FIG. 4 is an exploded perspective view showing a backlight unit adopting the edge light system disclosed in the following Patent Document 1.

A backlight unit 30 includes members such as a holding frame 31, a heat radiation plate 34, a light guide plate 35, a linear light source 36, an optical sheet 37 and a supporting frame 38.

Among these members, the holding frame 31 is a metal frame made of a bottom wall 31a brought in contact with a bottom surface of the heat radiation plate 34, and a pair of sidewalls 31b and 31b covering an opening of a cover portion 34a by raising from both side edges of the bottom wall 31a. Two holes 32 each are provided at the sidewalls 31b and 31b. Also, the supporting frame 38 supporting a liquid crystal display panel is in a square frame shape having the same size as the bottom surface of the heat radiation plate 34. A clip 39 in a triangular prism is formed at a location corresponding to each of the holes 32 provided at the sidewalls 31b and 31b opposing to the holding frame 31.

After the heat radiation plate 34, the light guide plate 35, the light source 36 and the optical sheet 37 are mounted on the holding frame 31, the resultant structure is covered with the supporting frame 38. The backlight unit 30 is assembled by mounting the supporting frame 38 to the holding frame 31.

In the assembly, a joint between the supporting frame 38 and the holding frame 31 holds a fitting state, by utilizing a spring force of the both sidewalls. This is performed by disposing the supporting frame 38 between the both sidewalls 31b and 31b, and pressing the supporting frame 38 downwards. Also, each clip 39 is fitted into each hole 32, by widening the gap between the both sidewalls 31b and 31b at an inclined surface of each clip 39.

[Patent Document 1] JP-A-2004-165031 (FIG. 1, paragraphs 0018 to 0023)

DISCLOSURE OF THE INVENTION

Problems to be Solved

The supporting frame as described above is joined to be secured by protruding the clip 39 from the hole 32 in the vertical direction, and by utilizing the spring force of the both sidewalls 31b and 31b, and also using the supporting frame 38 with wide frame sides and a large thickness, in the horizontal direction. When the spring force of the holding frame is either weak from the beginning or becomes weak for some reason, or in a case when the protrusion height of the clip 39 in a triangular prism is small, the clip 39 may unfasten from the hole 32 easily.

In recent years, in order to increase a display area of a display screen, such a supporting frame tends to be narrowed, by reducing the width and thickness of the frame sides. Also, the supporting frame is made of a resin mixed with conductive filler. This is to carry out a function of blocking noise, as well as a function of supporting and securing the members. The supporting frame made of such a resin has an increased amount of the conductive filler, by sacrificing the strength of the frame sides, thereby further decreasing its mechanical strength.

The backlight using such a supporting frame is generally transported to a device manufacturer and mounted on an assembly line for the next process, after assembled at a parts manufacturer. During that time, the supporting frame may unfasten from the holding frame by vibration, shock, or handling.

When the supporting frame unfastens from the holding frame, a repair is necessary. However, it is difficult to perform such a repair at the assembly line, thereby requiring extra efforts. In an actual manufacturing line, it is excluded as a defect before being put on the assembly line, to increase productivity.

The occurrence of such a defect should be prevented, but locking means of any sort was not provided to supporting frames in related art. Therefore, an individual backlight unit needs to be inspected whether the supporting frame is firmly secured to the holding frame or not. This not only requires an inspection step but lowers efficiency of an assembly operation in the next process.

When the frame sides of the supporting frame are reduced in width and thickness, a display may be affected even after a liquid crystal panel is being mounted. An unsteady support of the liquid crystal panel may cause a slide of a display area of the liquid crystal panel and wrinkles on an optical sheet.

The present invention has been made to solve the above problems of the related art, and an advantage of the present invention is to provide a backlight unit preventing a supporting frame from unfastening and a liquid crystal display employing the backlight unit.

Means to Solve the Problems

In order to obtain the above advantage, a backlight unit according to an embodiment includes a box type case having sidewalls and an upper opening, optical members such as a light source and an optical sheet contained in the box type case, and a supporting frame in a frame shape securing the optical members in place by being fitted in the opening of the box type case and supporting a liquid crystal display panel. A first engaging portion is provided to the inside of the sidewall of the box type case, and a second engaging portion is provided to the outer surface of the sidewall of the supporting frame being fitted in the upper opening of the box type case. The second engaging portion is a U-shaped groove with a predetermined depth and having an opening at an upper portion of the supporting frame. Locking means is attached to a bottom wall surface of the U-shaped groove, such that the locking means is engaged with and locked by the first engaging portion as the first and second engaging portions engage each other.

The backlight unit according to an embodiment wherein the bottom wall surface of the U-shaped groove has a protruding portion protruding by a predetermined length from an outer surface of the sidewall. The locking means is formed by a projection raised upward from a tip edge of the protruding portion of the bottom wall surface.

The backlight unit according to an embodiment, wherein the locking means is a linear projection having a predetermined length.

The backlight unit according to an embodiment, wherein the protruding portion has a length protruding from the outer surface of the sidewall that is approximately the same or smaller than the thickness of the sidewall of the box type case.

The backlight unit according to an embodiment, wherein the first engaging portion has a groove that is large enough to contain the protruding portion provided to the sidewall of the supporting frame to the sidewall of the box type case. An upper portion of the sidewall of the groove has an inward recess, and the locking means is engaged with the recess.

A liquid crystal display according to an embodiment includes the backlight unit disclosed in an embodiment, wherein a liquid crystal display panel is mounted on the supporting frame and is secured by a front surface frame.

A liquid crystal display according to an embodiment includes a box type case in a rectangular shape having sidewalls and an upper opening, optical members such as a light source and an optical sheet contained in the box type case, and a supporting frame in a frame shape securing the optical members in place by being fitted in the opening of the box type case. The liquid crystal display also includes a liquid crystal display panel mounted on the supporting frame, a flexible circuit board connected to one side of the liquid crystal display panel, and a front surface frame securing the liquid crystal display panel. An engaging portion is provided to the sidewall at a long side of the box type case. An engaging portion that is a U-shaped groove with a predetermined depth and having an opening at an upper portion of the supporting frame is provided to an outer surface of the sidewall at one long side of the supporting frame, and locking means is attached to a bottom wall surface of the U-shaped groove, and an engaging portion is provided to an inner surface of the sidewall at the other long side of the supporting frame. The locking means is engaged with and locked by the engaging portion as the engaging portion of the box type case and the engaging portion of the supporting frame engage each other. The flexible circuit board is placed at the other long side of the supporting frame.

Advantages of the Invention

By providing the above features, the present invention offers advantages as hereinafter described. According to embodiments, when the locking means is attached to the second engaging portion, and the first and second engaging portions engage each other, the locking means is engaged with and locked by the first engaging portion. Accordingly, the supporting frame of the backlight unit does not unfasten from the box type case, even vibration, shock and the like occur during transportation and the like. As a result the supporting frame does not need to be inspected for unfastening, repaired and the like, thereby reducing the number of assembly steps of a device.

Even when a frame side of the supporting frame is narrowed and made bendable, by providing the locking means to the supporting frame, the engagement does not unfasten because of the bended frame side. As a result, the frame side can be reduced in width, thereby narrowing the supporting frame.

Furthermore, the locking means is provided in the U-shaped groove formed to the outer surface of the sidewall.

As a result, the locking means can be provided with hardly any protrusion from the outer surface of the sidewall.

Also, by making the locking means of the linear projection, an engaging area with the first engaging portion increases. As a result, the locking becomes stable.

According to an embodiment, the protruding portion of the bottom wall surface of the U-shaped groove does not protrude outside from the sidewall surface of the case. As a result, it does not become an obstacle when built into various devices, thereby allowing an easy assembly.

According to an embodiment, the supporting frame of the backlight unit does not unfasten from the box type case even vibration, shock and the like occur during the transportation and the like. The supporting frame does not need to be inspected for unfastening, repaired and the like, when the liquid crystal display panel is built into the backlight unit. As a result, the number of assembly steps can be reduced and productivity of the liquid crystal display can be increased. And even after the liquid crystal display panel is built in, it is possible to provide the liquid crystal display having the liquid crystal panel prevented from shifting and the optical sheet free from wrinkles.

According to an embodiment, not only the locking means can be provided with hardly any protrusion from the outer surface, but also productivity of the liquid crystal display can be increased, and even after the liquid crystal display panel is built in, the liquid crystal panel does not shift and the optical sheet is free from wrinkles. Further, the liquid crystal display can be bent toward the back surface side without damaging the flexible circuit board.

BRIEF DESCRIPTION OF THE DRAWINGS

FIG. 2. Showing a supporting frame which supports a liquid crystal display panel of the liquid crystal display employing the backlight unit of FIG. 1, FIG. 2A is a perspective view and FIG. 2B is an enlarged view of a portion A of FIG. 2A.

FIG. 3. Showing a backlight unit assembled with the backlight of FIG. 1, FIG. 3A is a perspective view and FIG. 3B is an enlarged view of a portion B of FIG. 3A.

REFERENCE NUMERALS

Figure 1:
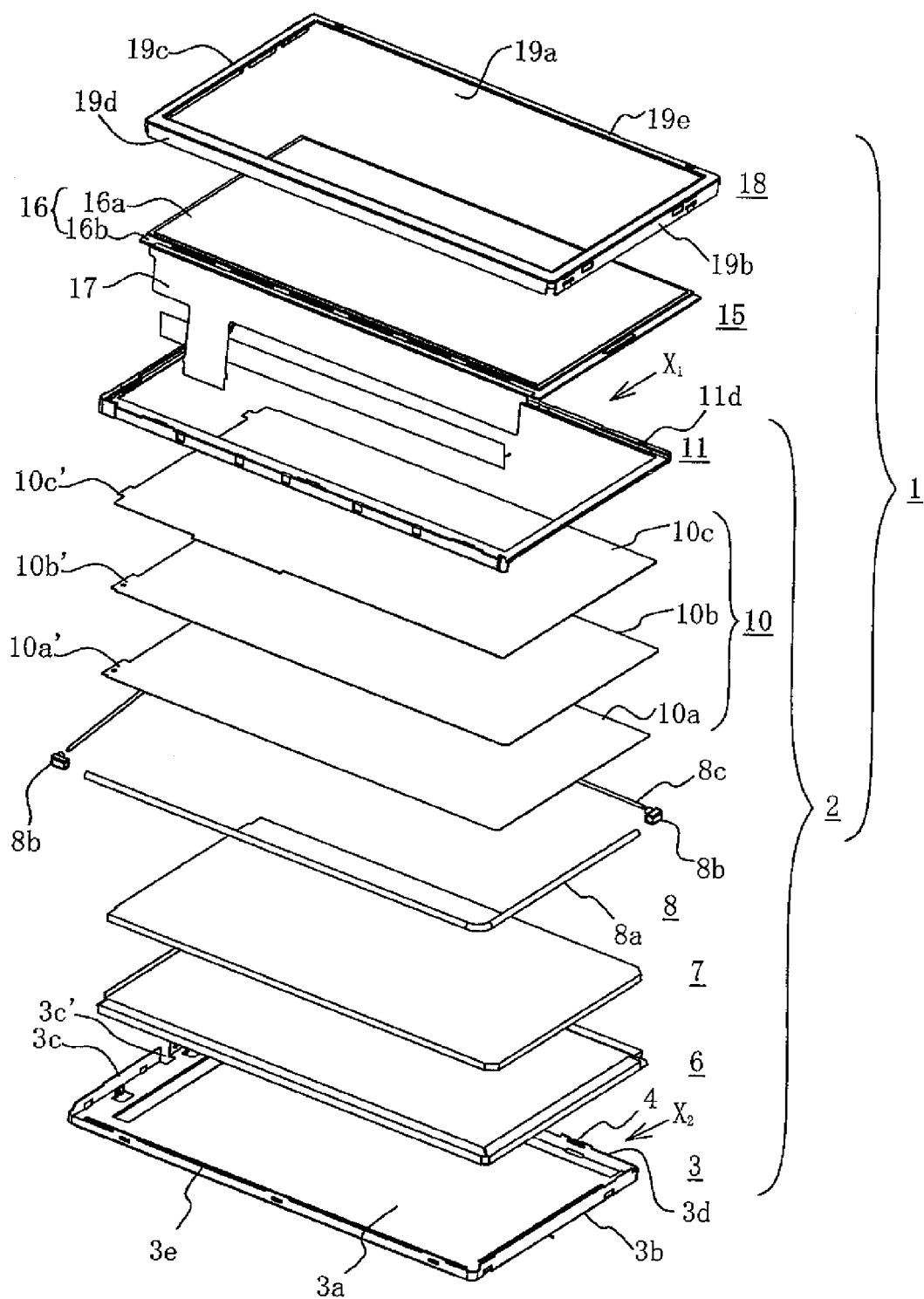
FIG. 1 is an exploded perspective view showing a liquid crystal display employing a backlight unit according to an embodiment of the present invention.
Figure 4:
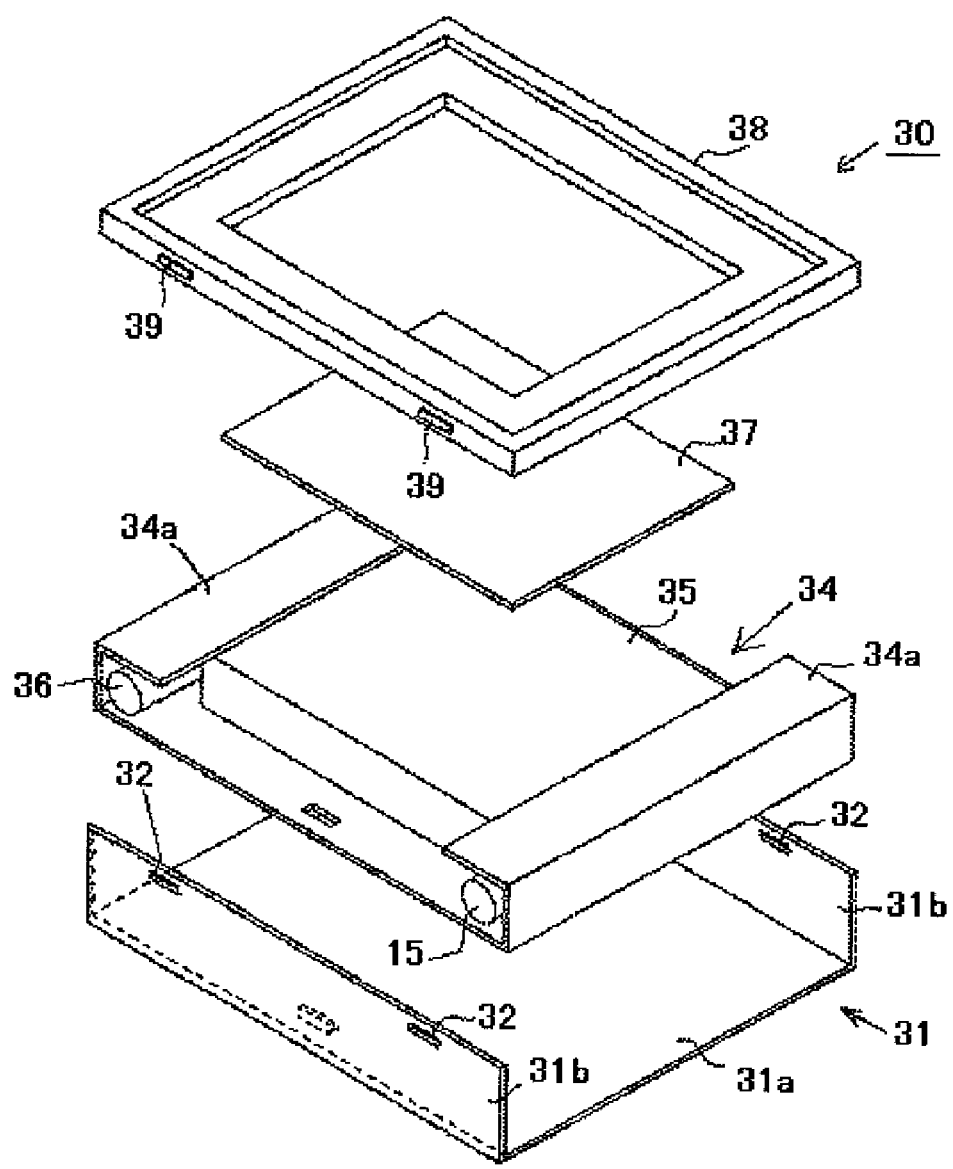
FIG. 4 is an exploded perspective view showing a backlight unit of related art.

1: liquid crystal display
2: backlight unit
3: back lid case (box type case)
4: engaging portion
6: reflection plate
7: light guide plate
8: linear light source
10: optical sheet
11: supporting frame
13: U-shaped groove
14: linear projection (locking means)
15: liquid crystal display panel
18: front surface frame

DESCRIPTION OF THE PREFERRED EMBODIMENTS

Hereinafter, a preferred embodiment of the present invention will be described with reference to the accompanying drawings. However, the following embodiment is an example of a backlight unit and a liquid crystal display employing the backlight unit to substantiate the art of the present invention, and the invention is not intended to be specified by the backlight unit and the liquid crystal display. The present invention may equally apply to other embodiments included within the scope of the appended claims.

First Embodiment

FIG. 1 is an exploded perspective view showing a liquid crystal display employing a backlight unit according to an embodiment of the present invention. Showing a supporting frame which supports a liquid crystal display panel of the liquid crystal display employing the backlight unit of FIG. 1, when viewed from an $X_1$ direction, FIG. 2A is a perspective view and FIG. 2B is an enlarged view of a portion A of FIG. 2A. Showing a backlight unit assembled with the backlight of FIG. 1, FIG. 3A is a perspective view and FIG. 3B is an enlarged view of a portion B of FIG. 3A. FIG. 3 is a diagram of a back lid case of FIG. 1, when viewed from an $X_2$ direction.

As shown in FIG. 1, a liquid crystal display 1 includes members such as a backlight unit 2, a liquid crystal display panel 15 and a front surface frame 18. Among these members, the liquid crystal display panel 15 is configured with a panel 16 and a flexible circuit board 17 which is connected to the panel 16. The panel 16 includes two sheets of substrates 16a and 16b placed opposing to each other, interposing a liquid crystal layer (not shown) therebetween. The liquid crystal display panel 15 is mounted on a supporting frame 11 after the backlight unit 2 is being assembled, and secured to the backlight unit 2 by the front surface frame 18. The two sheets of substrates 16a and 16b are different in size, and two of their sides are aligned. At the other two sides which are not aligned, a driver for scanning lines and a driver for picture signal lines are mounted on the substrate 16b, respectively.

The backlight unit 2 includes a back lid case 3. A reflection plate 6, a light guide plate 7, an optical sheet 10, a linear light source 8 and the like are housed in the case 3. The backlight unit 2 also includes a supporting frame 11 which houses and secures these components, and also supports the liquid crystal display panel 15.

Among these components, the back lid case 3 has a bottom plate 3a in a rectangular shape and side plates 3b through 3e having a low profile and being bent from an outer periphery of the bottom plate 3a. The back lid case 3 is made of a shallow box type case opening upward, and formed by sheet metal processing.

The side plate 3c is formed with one or a plurality of openings 3c' from which a lead wire connected to the linear light source 8 is lead out. Among the side plates 3b through 3e, the side plate 3d at a long side is formed with a plurality of engaging portions 4, respectively. Each engaging portion 4, as shown in FIG. 3, is configured with a narrow groove having a predetermined width and length, that is, a slit 4a, and a recess 3d' where the side plate 3d above the slit 4a is being recessed. By recessing the side plate 3d towards inside of the back lid case, when a linear projection 14 provided to the supporting frame 11 hereinafter described is engaged with the recess 3d', the projection may be provided without protruding from a surface of the side plate. Also, a plurality of engaging portions is formed at a long side of the side plate 3e opposite from the side plate 3d. However, unlike the engaging portions 4, these engaging portions are formed in a simple structure with only a slit.

A reflection plate 6 is laid on a surface of the bottom plate 3a of the back lid case 3. The reflection plate 6, for example, uses a white PET film as a reflective material. The light guide plate 7 is substantially the same size as the liquid crystal display panel 15, and formed of a transparent material having a relatively large thickness and able to guide light, for example, an acrylic resin. At an outer periphery of the light guide plate 7, the linear light source 8 and a light shielding tape (not shown) are arranged. An approximately L-shaped fluorescent lamp 8a is used as the linear light source 8. At the ends, sockets 8b and 8b are mounted, respectively, and arranged in abutting contact with a corner of the light guide plate 7. The light shielding tape is a tape made of a material having a light shielding effect, and arranged at another corner of the light guide plate 7 where the fluorescent lamp 8a is not arranged.

For the optical sheet 10, a diffusion sheet 10a, a lens sheet 10b and a reflective polarizing sheet 10c, all of which have approximately the same size as the light guide plate 7, are used. At one edge of the sheets 10a through 10c, protruding pieces 10a' through 10c' for positioning and securing are formed, respectively.

The supporting frame 11, as shown in FIG. 2, has a window opening 11a which exposes the optical sheet 10 inside. The supporting frame 11 is formed in a frame whose periphery is surrounded with four frame sides 11b through 11e. The exterior has a size which fits into the upper opening of the back lid case 3, and made of a synthetic resin material.

As the synthetic resin material, the one mixed with conductive filler may be used. By using the supporting frame 11 mixed with the conductive filler, noise released from the fluorescent lamp 8a is effectively blocked from radiating outside. When an amount of the conductive filler mixed to the synthetic resin material is increased, noise suppression becomes more effective. However, this leads to a problem of decreasing strength of the supporting frame 11, whereby it becomes more bendable. But according to the present invention in which locking means hereinafter described is attached to the supporting frame 11, even if the supporting frame 11 becomes bendable, the supporting frame 11 can be prevented from unfastening from the back lid case 3. Therefore, it is possible to increase the amount of the conductive filler mixed into the synthetic resin material for noise suppression.

Among the four frame sides 11b through 11e, two frame sides 11c and 11e have wider widths than the other frame sides 11b and 11d. This is because the frame sides 11c and 11e cover the fluorescent lamp 8a, and an area outside a display area is wide, as various drivers are mounted on the substrate 16b forming the liquid crystal panel 15. On the other hand, the frame sides 11b and 11d are reduced in width to narrow the frame. This is because the area outside the display area of the liquid crystal panel 15 is narrow, and only a fine lead wire 8c connected to the fluorescent lamp 8a is positioned on this area.

At the frame sides 11b through 11e, enclosing walls raised upward from the outer periphery of the surfaces are formed. By forming the enclosing walls, the liquid crystal display panel can be positioned when the liquid crystal panel 15 is mounted on the supporting frame 11. At the frame side 11e, in order to prevent the flexible circuit board 17 connected to the liquid crystal panel 15 from lifting upward by the enclosing wall raised upward, the enclosing wall is formed near both ends of the frame side 11e, so that it does not overlap with the flexible circuit board 17.

Among the frame sides 11b through 11e, a projection portion (not shown) which engages a slit at the side plate 3e of the back lid case 3 is formed to an inner wall side of the frame side 11e. By providing an engaging portion to the inner wall side as above, the side plate 3e is covered by the frame side 11e having a wide width, when the frame side 11e is engaged with the side plate 3e of the back lid case 3. Also, an engaging means to engage the back lid case with the frame side is not exposed to the outside of the back lid case. The flexible circuit board 17 at the side of the frame side 11e having a wide width is prevented from being damaged by the side plate 3e of the back lid case 3. Especially, as the flexible circuit board 17 is generally bent toward a rear surface side of the back lid case 3, it is important that the engaging means is not exposed to the outside of the back lid case, in order to prevent the flexible circuit board from being damaged.

At the frame side 11d, a plurality (four in FIG. 2) of engaging portions $12_1$ through $12_4$ are formed at an outer wall. The engaging portions $12_1$ through $12_4$ are formed in U-shaped grooves 13 at the outer wall of the frame side 11d.

Each of these U-shaped grooves 13, as shown in FIG. 2B, has a predetermined width $W_0$ in the longitudinal direction of the frame side 11d, a depth $W_1$ from the surface of an outer wall 112d of the frame side 11d, and a depth H from an upper surface 111d. The groove also has a flat bottom wall 13a formed at its bottom. The bottom wall 13a is formed with a protruding portion 13b protruding by a predetermined length $W_2$ towards the surface of the outer wall 112d.

When the supporting frame 11 is fixed to the back lid case 3, the recess 3d' of the case side plate 3d is inserted and engaged with the U-shaped groove 13.

Among the four engaging portions $12_1$ through $12_4$, the engaging portions $12_2$ and $12_3$ in between both ends are formed with the linear projection 14 having a predetermined length $W_3$ and height, at approximately the center of a tip edge of a bottom wall surface 14 in the U-shaped groove 13. The linear projection 14 is engaged with the above recess 3d', and carries out a locking function to prevent the frame side 11d from unfastening. The above linear projection 14 is not limited to a linear shape, but may be of any shape, for example, a quadrangular prism, a triangular prism or a circular cylinder. However, if it is too small a cylinder, there is a possibility of being removed by an external force, so that the linear shape is preferable.

Among the four frame sides 11b through 11e, the frame side 11d is narrower and longer, compared to the other frame sides 11c and 11e, thereby being bendable. The frame side 11d tends to bend easily when the recess 3d' of the case side plate 3d is simply inserted into each U-shaped groove 13. The center portion, especially, tends to bend more easily than the both ends. Therefore, among the four engaging portions $12_1$ through $12_4$, the engaging portions $12_2$ and $12_3$ in between the both ends are at least provided with the projection 14. This effectively locks the frame side 11d from loosening in the horizontal direction. Although the both ends are excluded, the projection 14 may be formed to the both ends. By forming also to the both ends, the loosening can further be prevented.

If the length $W_2$ of the protruding portion 13b of the bottom wall 13a is set approximately the same as the thickness of the back lid case 3, the protruding portion 13b does not protrude outside from the surface of the outer wall of the backlight unit 2 when engaging. As the protrusion is eliminated, an easy assembly is made possible when built into other apparatuses.

The lengths $W_0$, $W_1$, H, $W_3$ and the like are as follows. For a 7-inch liquid crystal display panel, for example, a supporting frame which has a dimension of approximately 165.40× 92.20 mm is used. $W_0$ is approximately 6.00 mm, $W_1$ is approximately 2.00 mm, H is approximately 1.50 mm, $W_3$ is approximately 0.30 mm, and the height of the linear projection 14 is approximately 0.15 mm. It has been found out that the above dimensions ensure a sufficient engaging effect.

By not providing a portion engaging the back lid case 3 to the frame sides 11b and 11c, the backlight unit 2 does not need to be enlarged in the longitudinal direction of the backlight unit 2. The frame side 11e is formed with a plurality of portions engaged with the back lid case 3, at an inner wall opposite from the frame side 11d (not shown).

The backlight unit 1 is assembled by laying the reflection plate 6 to the bottom portion 3a of the back lid case 3, and mounting the light guide plate 7 on the reflection plate 6. At an outer periphery of the light guide plate 7, the L-shaped fluorescent lamp 8a and the light shielding tape are arranged, and the plurality of optical sheets 10 are mounted on them. The lead wire 8c, which is connected to the sockets 8b and 8b, is fixed to an end of the fluorescent lamp 8a and lead out from the opening 3c' to the outside. A connector 9 is fixed to the other end and connected to an outside power source.

After containing the reflection plate 6, the light guide plate 7 and the optical sheet 10 in the back lid case 3, a side of the frame side 11d is engaged with the case side plate 3d, by moving the supporting frame 11 in the horizontal direction. Next, the frame side 11e is engaged with the case side plate 3e by the engaging portion formed at the inner wall of the frame side 11e. The backlight unit 2 is assembled by securing the light guide plate 7 and the optical sheet 10 (see FIG. 3A). When the supporting frame 11 is fitted into the back lid case 3, as shown in FIGS. 2B and 3B, movement in the vertical direction is restricted by inserting the protruding portion 13b of the supporting frame 11 into the slit 4a of the back lid case 3. Also, movement in the horizontal direction is locked by arranging the linear projection 14 is engaged with the recess 3d' of the case side plate 3d.

Next, the liquid crystal panel 15 is mounted on the supporting frame 11. At this time, the side of the liquid crystal panel 15 connected to the flexible circuit board 17 is deposited at the side of the supporting frame 11 having the frame side 11e. A top of the mounted liquid crystal panel 15 is covered by the front surface frame 18, and the liquid crystal display is completed by securing the front surface frame 18 to the back lid case 3.

By using the backlight unit 2, the supporting frame 11 is prevented from unfastening from the back lid case 3. When the liquid crystal panel 15 is built into the backlight unit 2 in the next process, the supporting frame 11 does not need to be inspected for unfastening, repaired, and the like. As a result, the number of assembly steps of the device can be reduced.

During the backlight unit is transported to a device manufacturer after being assembled at a parts manufacturer, or at an assembly line and the like after that, for example, there is no possibility of the supporting frame unfastening from the back lid case by vibration, shock or handling. Accordingly, the supporting frame does not need to be inspected for unfastening, repaired and the like. As a result, the number of assembly steps is reduced, and the productivity of the liquid crystal display can be increased.

Further, the supporting frame 11 does not move easily. As a result, the liquid crystal panel 15 and the optical sheet 10 can be mounted and secured in a stable manner.

For the light source of the backlight unit, the fluorescent lamp, which is the linear light source, is used to explain. However, the light source is not limited to the linear light source such as the fluorescent lamp, but the one using a point light source such as an LED, or the one using an area light source may be used instead. There is no limit to the shape of the light source as long as it uniformly illuminates the liquid crystal panel, when light from the light source is emitted from the backlight.

The invention claimed is:

1. A backlight unit, comprising:
a box type case having a sidewall and an upper opening;
an optical member provided mainly with a light source and an optical sheet contained in the box type case; and
a supporting frame in a frame shape securing the optical member in place by being fitted in the opening of the box type case and supporting a liquid crystal display panel;
a first engaging portion being provided to an inside of the sidewall of the box type case, and a second engaging portion being provided to an outer surface of the sidewall of the supporting frame being fitted in the upper opening of the box type case, the second engaging portion being a U-shaped groove with a predetermined depth and having an opening at an upper portion of the supporting frame and
locking means being attached to a bottom wall surface of the U-shaped groove, the locking means being engaged with and locked by the first engaging portion as the first and second engaging portions engage each other, wherein
the bottom wall surface of the U-shaped groove has a protruding portion protruding by a predetermined length from an outer surface of the sidewall, and the locking means is formed by a projection raised upward from a top edge of the protruding portion of the bottom wall surface.

2. The backlight unit according to claim 1, wherein the locking means is a linear projection having a predetermined length.

3. The backlight unit according to claim 1, wherein the protruding portion has a length protruding from the outer surface of the sidewall that is one of approximately the same and smaller than the thickness of the sidewall of the box type case.

4. The backlight unit according to claim 1, wherein
the first engaging portion has a groove that is large enough to contain a protruding portion provided to the sidewall of the supporting frame to the sidewall of the box type case,
an upper portion of the sidewall of the groove has an inward recess, and the locking means is engaged with the recess.

5. A liquid crystal display, comprising:
the backlight unit according to claim 1; and
a liquid crystal display panel mounted on the supporting frame and secured by a front surface frame.

6. A liquid crystal display, comprising:
a box type case in a rectangular shape having a sidewall and an upper opening;
an optical member provided mainly with a light source and an optical sheet contained in the box type case; and
a supporting frame in a frame shape securing the optical member in place by being fitted in the opening of the box type case;
a liquid crystal display panel mounted on the supporting frame; a flexible circuit board being connected to one side of the liquid crystal display panel; and
a front surface frame securing the liquid crystal display panel;
an engaging portion being provided to the sidewall at a long side of the box type case,
an engaging portion that is a U-shaped groove with a predetermined depth and having an opening at an upper portion of the supporting frame being provided to an outer surface of the sidewall at one long side of the supporting frame, and locking means being attached to a bottom wall surface of the U-shaped groove,
an engaging portion being provided to an inner surface of the sidewall at the other long side of the supporting frame,
the locking means being engaged with and locked by the engaging portion as the engaging portion of the box type case and the engaging portion of the supporting frame engage each other, and
the flexible circuit board being placed at the other long side of the supporting frame, wherein
the bottom wall surface of the U-shaped groove has a protruding portion protruding by a predetermined length from an outer surface of the sidewall, and the locking means is formed by a projection raised upward from a top edge of the protruding portion of the bottom wall surface.

* * * * *